United States Patent [19]

Williams

[11] 4,060,271
[45] Nov. 29, 1977

[54] WHEELCHAIR HOLD DOWN ASSEMBLY

[76] Inventor: Joseph J. Williams, 4546 58th, San Diego, Calif. 92115

[21] Appl. No.: 669,951

[22] Filed: Mar. 23, 1976

[51] Int. Cl.² .................. B60N 1/02; B60P 7/08; B61D 45/00; B62B 11/00
[52] U.S. Cl. .................. 296/65 R; 105/368 T; 105/473; 224/42.4; 280/242 WC; 296/19
[58] Field of Search .................. 105/159, 367, 368 T, 105/464, 469, 473, 483, 484, 485; 180/11; 214/38 A, 450; 224/29 R, 42.03 B, 42.25, 42.4, 42.45; 248/119 R, 503, 505, 507; 280/39, 47, 179 R, 242 WC; 297/45, 379, 433; 296/19, 65 R

[56] References Cited

U.S. PATENT DOCUMENTS

| | | | |
|---|---|---|---|
| 1,716,316 | 6/1929 | Lanning | 296/65 R |
| 1,835,840 | 12/1931 | Barclay | 296/65 R |
| 1,934,697 | 11/1933 | Butterworth | 105/368 T |
| 1,973,624 | 9/1934 | Hanlon | 105/368 T X |
| 2,539,997 | 1/1951 | Graves | 105/469 X |
| 2,713,891 | 7/1955 | Linquist | 297/379 |
| 3,071,348 | 1/1973 | Huber | 105/473 X |
| 3,614,043 | 10/1971 | Regan | 248/119 |
| 3,955,847 | 5/1976 | Schiowitz | 105/464 X |

Primary Examiner—Robert J. Spar
Assistant Examiner—Howard Beltran
Attorney, Agent, or Firm—Clarence A. O'Brien; Harvey B. Jacobson

[57] ABSTRACT

A three point tie down arrangement, have a quick release, for restraining wheelchairs in vehicles to prevent the chair from rotating and the wheels from leaving the floor during transit, and having sufficient strength to hold the wheelchair should the vehicle overturn.

2 Claims, 5 Drawing Figures

WHEELCHAIR HOLD DOWN ASSEMBLY

BACKGROUND OF THE INVENTION

1. Field of the Invention

Special buses are used for handicapped students and these buses are equipped to handle wheelchairs. The California Vehicular Code provides for wheelchair restraints, having at least a three point hold down and arranged to leave a nine inch aisle between the wheelchairs. Other code restrictions regarding the placement of the attachment means to the body of the buses, and the height of projection above the floor level are met by the present invention.

2. Description of the Prior Art

The prior art discloses locking means for carrying articles in transit. Huber, U.S. Pat. No. 3,071,348, discloses a hold down comprising two pair of tie means with chain portions and a tensioning means to restrain an automobile mounted on a pallet for transport. Graves, U.S. Pat. No. 2,539,997, discloses a car top carrier utilizing the conventional over-center type tightener. Reagan, U.S. Pat. No. 3,614,043, discloses a tie down for a wheel, the tie down having a chain portion and a conventional tightener.

SUMMARY OF THE INVENTION

The object of the present invention is to comply with safety standards for transporting wheelchairs by providing a three point hold down arrangement for wheelchairs, which is in the form of a V, and which will prevent rotation of the chair, and lifting of the wheels during transit, and also will retain the wheelchair should the vehicle in which it is transported overturn.

All chains and hooks are of a size to meet any transportation standards, and the entire device can be installed in less than two hours and takes little space in the vehicle.

The tie down arrangement is secured at three points to give a binding action, and arranged to tighten and lock readily, so that it can be quickly released.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 4:
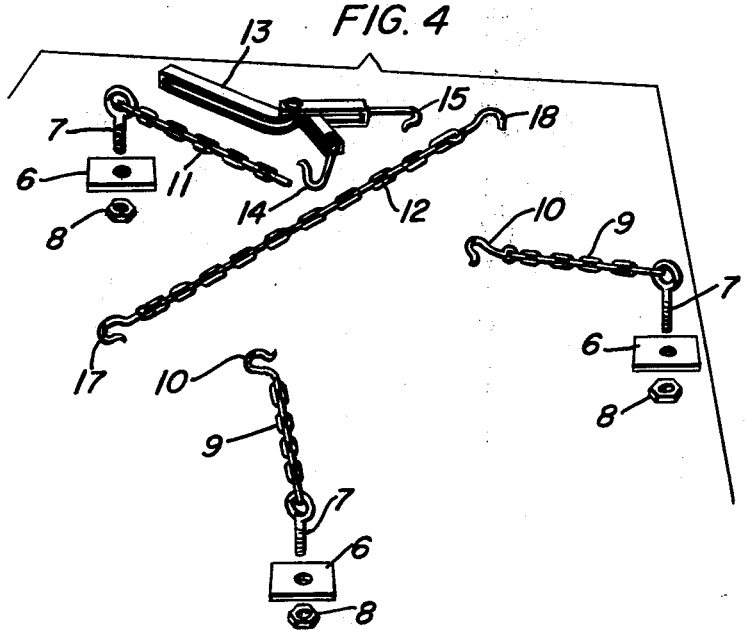
FIG. 4 is an over view of the tie down arrangement as secured to the bed of a vehicle.

The present system of restraining wheelchairs is universal in that it applies to all sizes of the three major styles of wheelchairs in use. Referring to FIG. 4 of the drawings, three points of attachment for the bed of a vehicle are shown, featuring a backing plate 6 about 4 × 4 × ¼ inches in dimension, an eyebolt 7 and a nut 8. The eyebolts are made of ⅜ inch in diameter, grade 5 designation SAE thread and are about 1-½ inches in length. The two front eyebolts are about 27 inch apart to accomodate any width of chair and are equidistant from the rear eyebolt. The three eyebolts thus are placed at the apices of an isosceles triangle, the base of which is 27 inches wide, and the perpendicular bisector of the base is 42-½ inches in length. By placing the rear eyebolts that distance behind the front eyebolts most known front to back lengths of wheelchairs are accommodated.

To the front eyebolts a chain 9 approximately nine links long, each link 1-⅜ inches in length is attached, which has a 3 inch S hook at its free end. The rear eyebolt has a chain 11 which is connected to a cross chain 12 by means of a conventional over-center type chain tightener 13. Such a tightener is commercially available, and has two hooks 14, 15 each attached to one of the chains and the singular movement of the lever arm of the tightener from release to engaged position has the effect of bringing and holding the two chains 11, 12 together until they are released by a single reverse rotation of the lever arm. The cross chain 12 has end hooks 17 and 18 for attachment to the side frame of the wheelchair.

Figure 1:
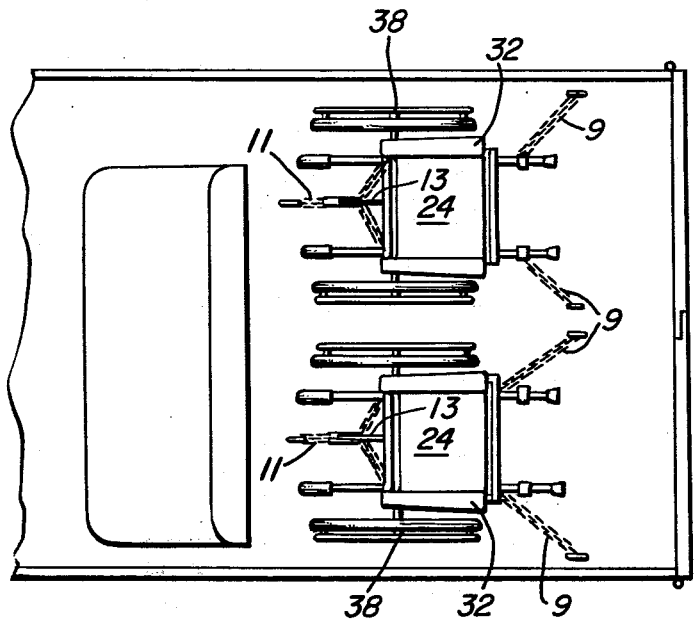
FIG. 1 is a top view of two wheelchairs tied down by the present arrangement, side by side in the back of a vehicle.
Figure 2:
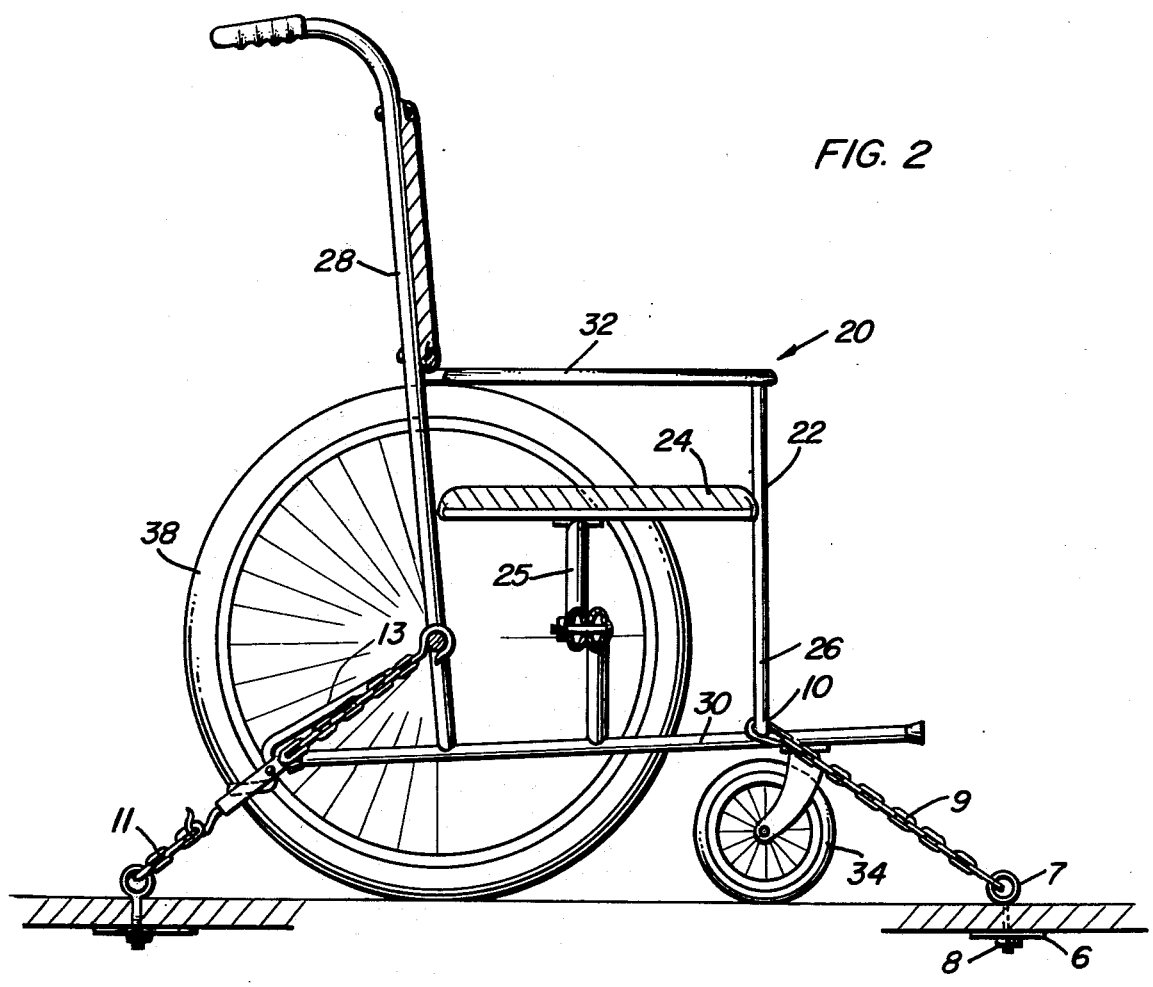
FIG. 2 is a side view, partially in section, of a wheelchair held down by the present arrangement.
Figure 3:
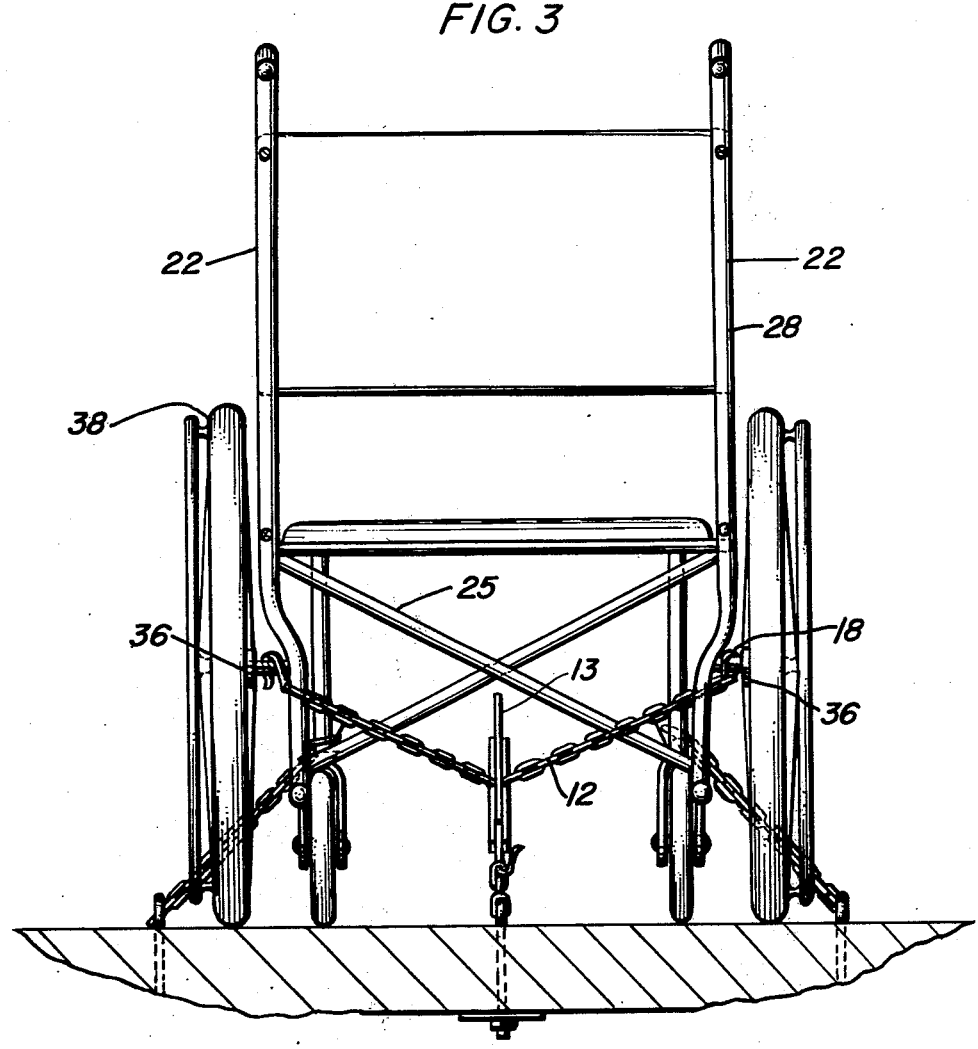
FIG. 3 is a rear view of a wheelchair secured by the tie down.

The usual wheelchair as shown, for example in FIG. 2, includes a main frame 20 having a pair of rigid side frames 22, a seat unit 24 extending between the side frames, and interconnected thereto by a pair of cross braces 25 shown in FIG. 3. The side frames comprise a vertical front post 26, a longer rear vertical post 28 bent over at the top to provide hand grips and a lower horizontal bar 30 which interconnects the front and rear vertical posts of each side frame. It is to bar 30 that the small forward caster type wheels 34 are attached. An upper bar 32 extending between posts 26 and 28 provides arm rest means. From the rear vertical post 28 spindle means 36 are attached outwardly thereof upon which the large propulsion or driving rear wheels 38 are mounted.

In operation, the S hooks of front chain 9 are placed about the juncture of rods 26 and 30. The hooks 17 and 18 of cross chain 12 are placed upon the spindles 36 upon which the propulsion wheels are mounted. The chain tightener 13 is extended between cross chain 12 and rear chain 11 and floats therebetween. The driver hook 15 is placed in the link of chain 11 consonant with the size of the chair, and hook 14 is set in cross chain 12, and the tightener has a 2 inch takeup.

Figure 5:
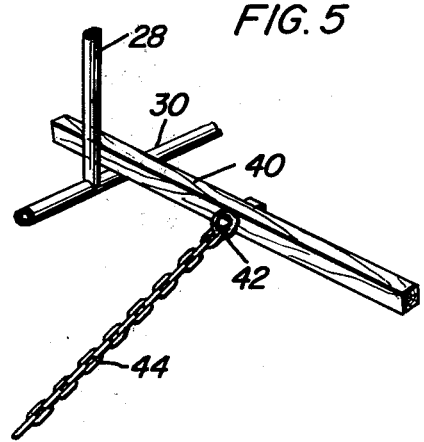
FIG. 5 is a modification used instead of the cross chain shown in FIG. 4.

Some chairs have batteries and other paraphernalia attached below with which a cross chain, such as 12, would interfere. In such a circumstance, the cross means shown in FIG. 5 may be substituted in the general arrangement shown in FIG. 4. A cross bar about 1 inch in diameter and 24 inches long having an eyebolt 42 in midsection to which is attached a chain member 44 is placed forwardly but contiguously with the juncture of vertical post 28 and lower horizontal support rod 30. The overcenter toggle tightening means 13 is then floated between the chains 44 and 11 to provide the third point of securement to the chair.

While the sizes of the component parts detailed have been found to satisfy the requirements of the safety code, they should not be considered as binding.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A three point tie down arrangement to secure wheelchairs to a vehicle bed comprising: means securing said wheelchairs to said vehicle bed including; three eyebolts, each eyebolt attached to the bed of the vehicle by a backing plate and nut, the two front eyebolts being spaced apart a width to accommodate the width of a wheelchair, and the third eyebolt spaced rearwardly and equidistantly from each of the front two eyebolts a distance to accommodate the front to rear length of a wheelchair, link chains secured to the front eyebolts having an S-shaped hook at their respective free ends for attachment to the front side frame of the wheelchair at the juncture of the front vertical rod and lower horizontal rod of the chair, a third chain attached to the rear eyebolt, a flexible cross member adapted to extend transversely of the wheelchair beneath the seat thereof and attached to the rear side frame of the chair, an overcenter toggle chain tightener having a quick release attached to the flexible cross member and the last named chain and floating therebetween, so that pressure exerted on the fexible cross member and chain to tighten and secure the wheelchair to the bed causes the flexible cross member and chain to have a Y-shape.

2. A tie down arrangement as in claim 1, wherein the flexible cross member comprises a link chain having a hook at each end, said hook at each end engaging a spindle of the wheelchair upon which each of the propulsion wheels is mounted.

* * * * *